(12) United States Patent
Cabouillet et al.

(10) Patent No.: US 11,325,344 B2
(45) Date of Patent: May 10, 2022

(54) BACK PANEL OF A SEAT ELEMENT

(71) Applicant: Faurecia Sieges D'Automobile, Nanterre (FR)

(72) Inventors: Anne-Sophie Cabouillet, Boissy-le-Sec (FR); Fabrice Etienne, Bavilliers (FR)

(73) Assignee: Faurecia Sieges D'Automobile, Nanterre (FR)

( * ) Notice: Subject to any disclaimer, the term of this patent is extended or adjusted under 35 U.S.C. 154(b) by 0 days.

(21) Appl. No.: 16/746,709

(22) Filed: Jan. 17, 2020

(65) Prior Publication Data

US 2020/0238658 A1 Jul. 30, 2020

(30) Foreign Application Priority Data

Jan. 25, 2019 (FR) ...................... 19/00696

(51) Int. Cl.
*B32B 5/18* (2006.01)
*B32B 7/022* (2019.01)
*B60N 2/68* (2006.01)
*B60N 2/80* (2018.01)

(52) U.S. Cl.
CPC ............... *B32B 5/18* (2013.01); *B32B 7/022* (2019.01); *B60N 2/686* (2013.01); *B32B 2250/22* (2013.01); *B60N 2/80* (2018.02)

(58) Field of Classification Search
CPC .. B60N 2/686; B60N 2/80; B32B 5/18; B32B 7/022; B32B 2250/22
USPC ...................................................... 297/218.1
See application file for complete search history.

(56) References Cited

U.S. PATENT DOCUMENTS

| | | | |
|---|---|---|---|
| 5,915,783 A * | 6/1999 | McDowell | A47C 7/748 297/180.12 |
| 6,280,840 B1 | 8/2001 | Bernd et al. | |
| 6,685,863 B1 | 2/2004 | Yabushita et al. | |
| 7,250,586 B2 * | 7/2007 | Diemer | H05B 3/146 219/217 |
| 7,419,713 B2 * | 9/2008 | Wilkens | B32B 27/04 428/68 |
| 7,977,608 B2 * | 7/2011 | Diemer | B60N 2/002 219/217 |
| 2014/0191557 A1 * | 7/2014 | Galbreath | B60N 2/58 297/452.58 |
| 2015/0367762 A1 | 12/2015 | Yasuda et al. | |
| 2016/0375806 A1 | 12/2016 | Etienne et al. | |
| 2016/0375834 A1 | 12/2016 | Piederriere et al. | |
| 2017/0072821 A1 * | 3/2017 | Oh | B60N 2/5664 |

(Continued)

FOREIGN PATENT DOCUMENTS

| | | |
|---|---|---|
| CH | 564045 A5 | 7/1975 |
| DE | 7043318 U | 3/1971 |
| DE | 2915474 A1 | 11/1980 |

(Continued)

OTHER PUBLICATIONS

French Search Report issued in counterpart FR application No. 19/00696, dated Oct. 15, 2019, 2 pp.

(Continued)

*Primary Examiner* — Mark R Wendell
(74) *Attorney, Agent, or Firm* — Kaplan Breyer Schwarz, LLP

(57) ABSTRACT

A back panel of a motor vehicle seat element includes at least a first foam layer with at least two areas of different stiffness.

16 Claims, 5 Drawing Sheets

(56) References Cited

U.S. PATENT DOCUMENTS

2017/0283070 A1* 10/2017 Hall .................. B64D 11/0647
2017/0297467 A1   10/2017 Baba et al.

FOREIGN PATENT DOCUMENTS

| | | |
|---|---|---|
| DE | 3515631 A1 | 11/1985 |
| DE | 19743134 A1 | 4/1999 |
| DE | 19850231 A1 | 6/1999 |
| DE | 19820858 A1 | 11/1999 |
| DE | 10305064 A1 | 8/2004 |
| DE | 102004010810 | 9/2005 |
| DE | 10152768 B4 | 4/2006 |
| DE | 102004061102 A1 | 7/2006 |
| DE | 202006010886 U1 | 9/2006 |
| DE | 102010024416 A1 | 3/2011 |
| DE | 102016109924 A1 | 11/2017 |
| DE | 102018202153 A1 | 8/2019 |
| EP | 1818155 A1 | 8/2007 |
| FR | 2851524 A1 | 8/2004 |
| FR | 3037878 A1 | 12/2016 |
| GB | 1359734 A | 7/1974 |
| JP | 59-015350 U | 1/1984 |
| JP | 2009-291599 A | 12/2009 |
| JP | 2010-247667 A | 11/2010 |

OTHER PUBLICATIONS

English translation of Office Action issued in counterpart German patent application No. 102020101605.0, dated Dec. 23, 2020, 9 pp.

\* cited by examiner

BACK PANEL OF A SEAT ELEMENT

This application claims the priority benefit of French patent application number 19/00696, the content of which is hereby incorporated by reference in its entirety to the maximum extent allowable by law.

FIELD

The present disclosure generally concerns motor vehicle seats and, more particularly, back panels of seat elements.

BACKGROUND

Motor vehicle seats are formed of a plurality of elements, among which a seat bottom piece, a backrest, and most often a headrest. Back panels of seat elements, particularly of backrests and of headrests, are generally made of rigid plastic material.

SUMMARY

There is a need for a seat element back panel comprising at least two areas having a different stiffness, in a single piece.

An embodiment overcomes all or part of the disadvantages of known back panels of seat elements.

An embodiment provides a back panel of a motor vehicle seat element comprising at least a first foam layer with at least two areas of different stiffness.

According to an embodiment, said first foam layer is made of non-expanded foam.

According to an embodiment, said panel is formed of the stacking of a paint layer, of said first non-expanded foam layer, and of a second expanded foam layer.

According to an embodiment, said second foam layer has a surface area smaller than the surface area of said first foam layer.

According to an embodiment, each of said areas is made of foam having a different formulation.

According to an embodiment, a first area has a Shore D hardness in the range from 0 to 100, preferably in the range from 30 to 60, preferably in the range from 40 to 50.

According to an embodiment, a second area has a Shore A hardness in the range from 0 to 90, preferably in the range from 50 to 80, preferably from 60 to 70.

According to an embodiment, at least one device is fastened to the first area.

According to an embodiment, said panel is provided with an element of assembly to the rest of the seat element, at least partly located at the periphery of said panel.

According to an embodiment, said panel is a back panel of a backrest.

According to an embodiment, said panel is a back panel of a headrest.

An embodiment provides a method of forming a back panel of a motor vehicle seat element, comprising at least a step of deposition of a non-expanded foam layer formed of at least two areas of foams of different stiffness.

According to an embodiment, a first area has a Shore D hardness in the range from 0 to 100, preferably in the range from 30 to 60, preferably in the range from 40 to 50.

According to an embodiment, a second area has a Shore A hardness in the range from 0 to 90, preferably in the range from 50 to 80, preferably from 60 to 70.

According to an embodiment, the method comprises at least the successive steps of:

depositing, in a mold, a layer of paint;
depositing, on the paint layer, said non-expanded foam layer; and
depositing, on the non-expanded foam layer, an expanded foam layer.

According to an embodiment, an element of assembly to the rest of the seat element is placed at least partly at the periphery of said non-expanded foam layer before the deposition of the expanded foam.

According to an embodiment, the method comprises a cutting step, enabling to remove a peripheral portion of the expanded foam layer.

According to an embodiment, the deposition of said expanded foam layer is performed over a portion of the surface area of the said non-expanded foam layer.

The foregoing and other features and advantages will be discussed in detail in the following non-limiting description of specific embodiments in connection with the accompanying drawings.

DETAILED DESCRIPTION

Figure 1:
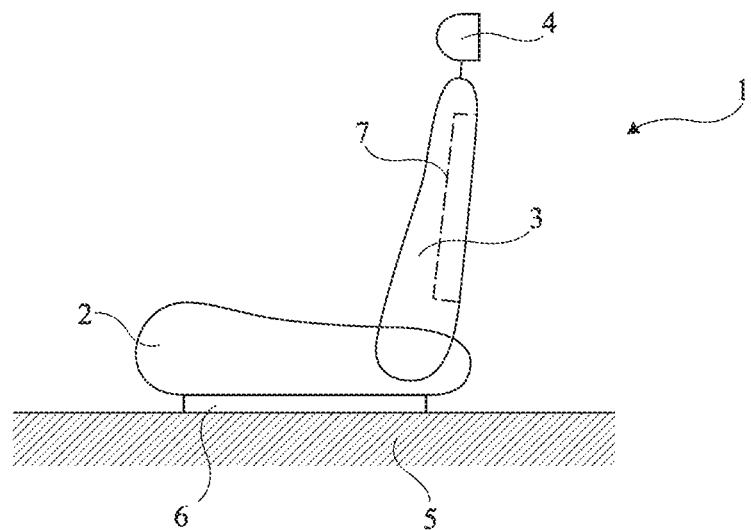
FIG. 1 is a simplified lateral view of a motor vehicle seat.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, usual seat elements which are not necessary to the understanding, such as the frame, have not been detailed.

Throughout the present disclosure, the term connected is used to designate a direct electrical connection between circuit elements, whereas the term coupled is used to designate an electrical connection between circuit elements that may be direct, or may be via one or more intermediate elements.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings or to a seat in a normal position of use.

The terms "about", "approximately", "substantially", and "in the order of" are used herein to designate a tolerance of plus or minus 10%, preferably of plus or minus 5%, of the value in question.

FIG. 1 is a simplified lateral view of a motor vehicle seat.

Such a seat comprises a seat bottom piece 2 having a backrest 3, most often topped with a headrest 4, jointed thereto. The assembly may be reinforced by a frame, generally made of metal. Seat bottom piece 2 may be connected to floor 5 of the vehicle by a slide rail mechanism 6. Seat 1 may also comprise one or a plurality of armrests (not shown).

Seat bottom piece 2, backrest 3, and headrest 4 each comprise, on a first surface, or front side, in contact with a user, upholstery.

Backrest 3 comprises on its second surface, or back side, a back panel 7. Panel 7 is a piece different from the upholstery, fastened to the back of backrest 3 of seat 1. The fastening is for example obtained by clips or by slide fasteners, on the frame or on the upholstery.

Reference will be made hereafter to the back panel of the backrest. However, unless otherwise specified, all that will be described hereafter more generally applies to any seat element for which the same problems are posed, for example, a headrest back panel.

Figure 2:
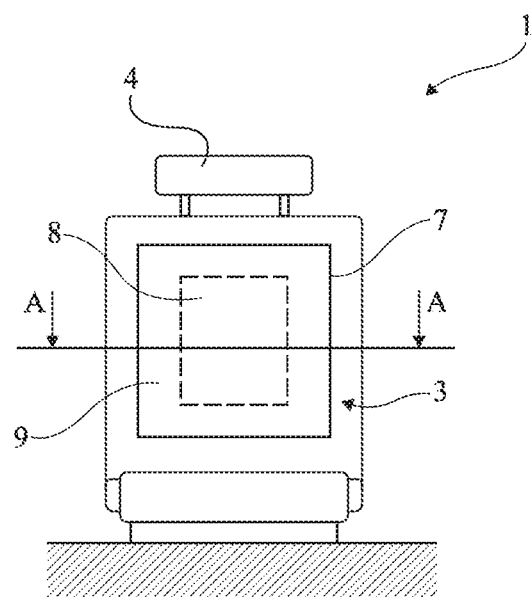
FIG. 2 is a simplified back view of an embodiment of a motor vehicle seat element.

FIG. 2 is a simplified back view of an embodiment of motor vehicle seat element.

Back panel 7 of backrest 3 comprises at least two areas of different stiffness. According to the embodiment shown in FIG. 2, panel 7 comprises a first area 8, called rigid. Area 8 is more rigid than a second area 9, called flexible. Area 9 for example has a flexibility of the same order as that of the upholstery of seat 1.

Although area 9 is here located at the periphery of area 8, the two areas may be arranged in different ways. The panel is here shown with a rectangular shape, but may have any other shape, for example, circular, triangular, etc.

Figure 3:
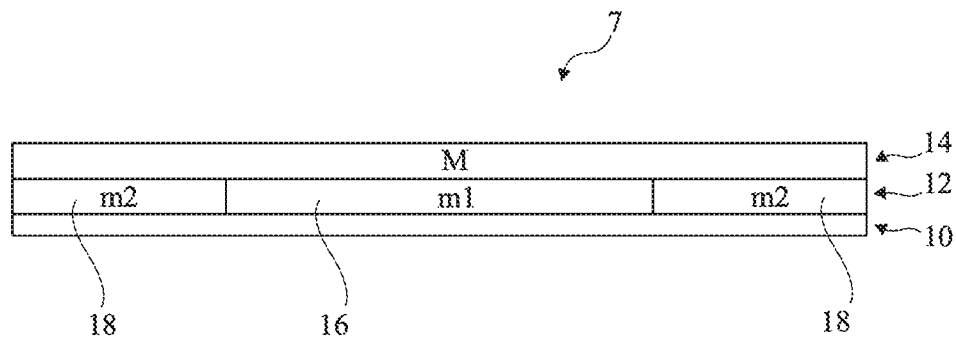
FIG. 3 shows a simplified cross-section view of an embodiment of a back panel of a seat element.

FIG. 3 is a simplified cross-section view of an embodiment of a back panel of a seat element.

FIG. 3 is a cross-section view along line A-A of FIG. 2 which is a horizontal cross-section line crossing backrest 3 through the first and second areas 8 and 9 of back panel 7.

Panel 7 is made of foam rather than of rigid plastic material.

Panel 7 is formed of the stacking of a layer of paint 10, of a layer of non-expanded foam 12, and of a layer of expanded foam 14. For example, layers 10, 12, and 14 have the same surface areas.

The formulations of the non-expanded and expanded foams, m (m1, m2 in FIG. 3) and M, are selected so that after the polymerization, expanded foam M has a lower density than non-expanded foam m. The chemical products thus used in the composition of expanded foam M are selected to obtain a polymerization reaction generating open cells, that is, cavities filled with air. Thereby, foam m contains less voids or air cells than foam M.

In practice, during a deposition by spraying, air bubbles are trapped in the foam. If air is thus intrinsically present in foam m after the polymerization, it is in a parasitic or negligible quantity as compared with the quantity of air present in foam M.

Layer 12 is formed of two non-expanded foams m1 and m2 having different formulations. Foams m1 and m2 are deposited in two areas 16 and 18 of layer 12, respectively. Foams m1 and m2 are preferably not mixed, except, for example, at the interface between foams m1 and m2. As a variation, to avoid any mixing, the deposition of foam m2 is performed once the polymerization of foam m1 is finished.

Foams m1 and m2 each extend across the entire thickness of layer 12. For example, the foam m1 of area 16 has a Shore D hardness in the range from 0 to 100, preferably in the range from 30 to 60, preferably in the range from 40 to 50. For example, the foam m2 of area 18 has a Shore A hardness in the range from 0 to 90, preferably in the range from 50 to 80, preferably from 60 to 70.

Areas 16 and 18 of layer 12 thus have stiffnesses different from each other. Areas 16 and 18 thus give panel 7 different stiffnesses in the respectively corresponding areas 8 and 9 of FIG. 2.

Although area 18 is here shown at the periphery of area 16 as an example, any other configuration is possible.

As a variation, a larger number of areas of different stiffness may be obtained by increasing the number of non-expanded foams of different formulations, used to form layer 12.

Figure 4:
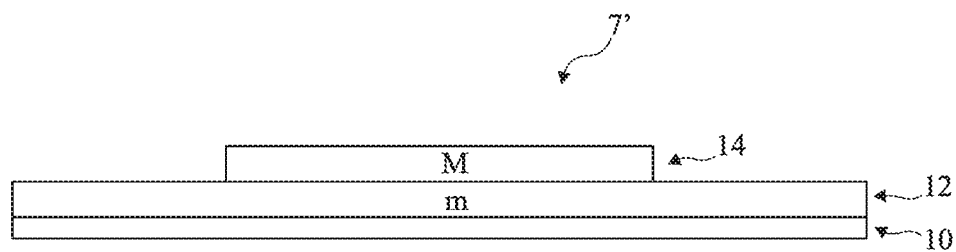
FIG. 4 shows a simplified cross-section view of another embodiment of a back panel of a seat element.

FIG. 4 shows a simplified cross-section view of another embodiment of a back panel of a seat element.

FIG. 4 is a cross-section view along line A-A of FIG. 2. Panel 7' is an alternative embodiment of panel 7 of FIG. 3.

Panel 7' is different from panel 7 in that layer 12 is formed of a single type of non-expanded foam m.

Panel 7' is further different from panel 7 in that layer 14 of expanded foam M only covers a portion of the surface area of layer 12.

For example, the surface of layer 12 which is not covered and the surface of layer 12 which is covered with layer 14 respectively correspond to the areas of different rigidities 8 and 9 of FIG. 2.

The embodiments of FIGS. 3 and 4 may be combined.

Figure 5:
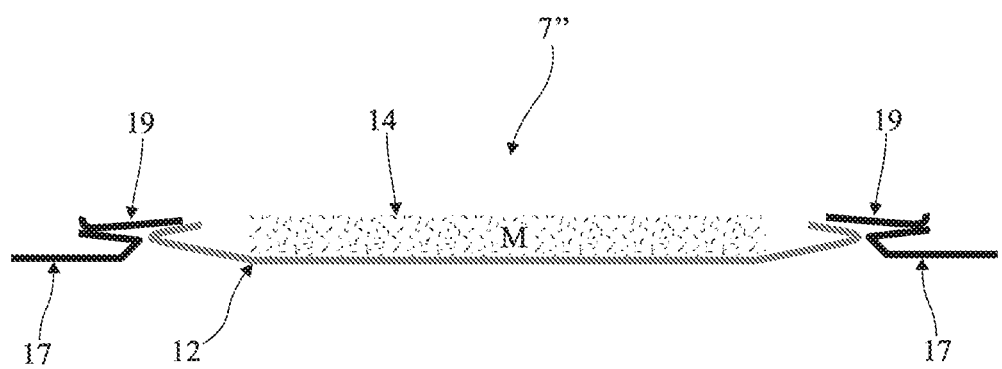
FIG. 5 shows a simplified cross-section view of another embodiment of a back panel of a seat element.

FIG. 5 shows a simplified cross-section view of another embodiment of a back panel of a seat element fastened to the seat upholstery.

FIG. 5 is a cross-section view along line A-A of FIG. 2. Panel 7" is an alternative embodiment of panel 7' of FIG. 4. Paint layer 10, although it is present, is not shown in FIG. 5 for clarity.

Panel 7" is different from panel 7' in that, in panel 7", non-expanded foam layer 12 is assembled to upholstery 17 of the seat by an invisible slide fastener 19. Slide fastener 19 is sewed on a folded portion of layer 12 and of upholstery 17 making the stitches invisible once panel 7" has been assembled to the seat. As a variation, other fastening means may be used.

Figure 6:
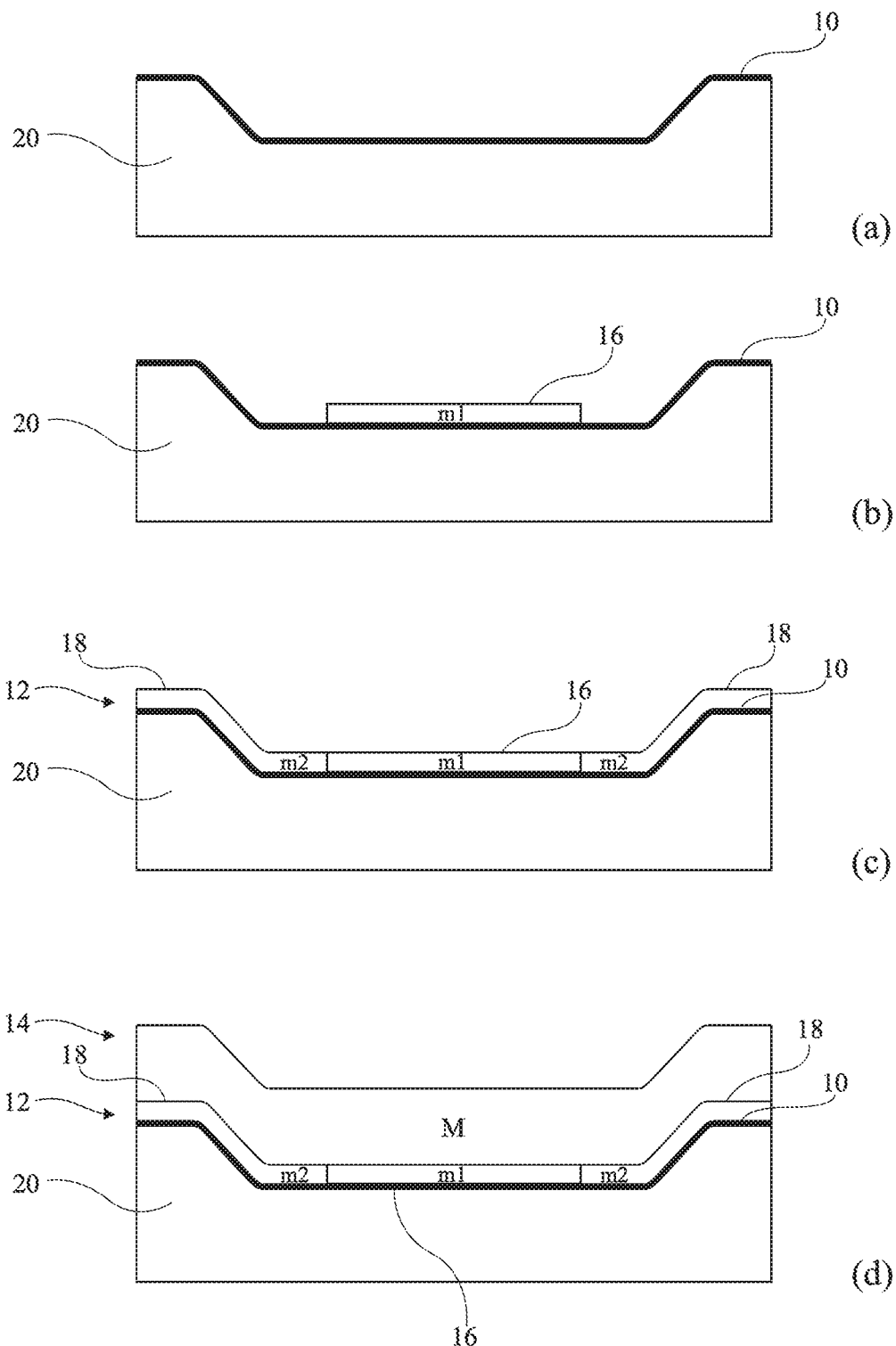
FIG. 6 shows in views (a) to (d) cross-sections illustrating steps of an embodiment of a method of forming a back panel of a seat element.

FIG. 6 shows, in views (a) to (d), cross-sections illustrating steps of an embodiment of a method of forming a back panel of a seat element.

A mold 20 having the shape of the back side, or outer surface, of the panel 7 to be formed is used. This surface preferably forms the visible surface of the back panel. The inside of the mold is preferably previously covered with a layer of a release agent, not shown in FIGS. 6(a) to 6(d).

In a first step, shown in FIG. 6(a), a paint layer 10 is deposited in the bottom of the mold.

In a second step, shown in FIG. 6(b), non-expanded foam m1 is deposited over a portion of the surface of paint layer 10.

In a third step, shown in FIG. 6(c), non-expanded foam m2 is deposited over the remaining portion of the surface of paint layer 10. Foam m2 extends over the same thickness as foam m1. Foams m1 and m2 form the layer of non-expanded foam 12.

According to an alternative embodiment, an element of assembly to the rest of the seat element (not shown) is then placed at least on a portion of the periphery of layer 12.

In a fourth step, shown in FIG. 6(d), a layer 14 of expanded foam M is deposited on the layer of non-expanded foam 12.

According to an embodiment, foam M only covers a portion of the surface area of layer 12.

Figure 7:
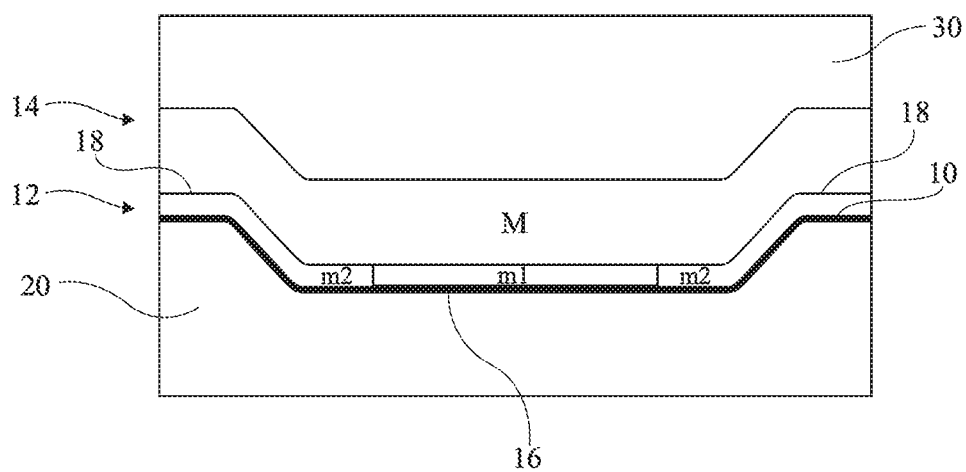
FIG. 7 shows a cross-section view illustrating a step of an embodiment of a method of forming a back panel of a seat element.

FIG. 7 shows a cross-section view of a closed mold illustrating a step of an embodiment of a method of forming a back panel of a seat element.

At this step, subsequent to that illustrated in FIG. 6(d), a die 30, or cover, is arranged on expanded foam layer 14 to close mold 20. Die 30 preferably has the shape of the back side, or hidden surface, of the panel 7 to be formed.

Die 30 is pressed against mold 20 to shape the thickness of layer 14 and give the back side or hidden surface of panel 7 a shape adapted to the seat element to which it will be fastened.

Figure 8:
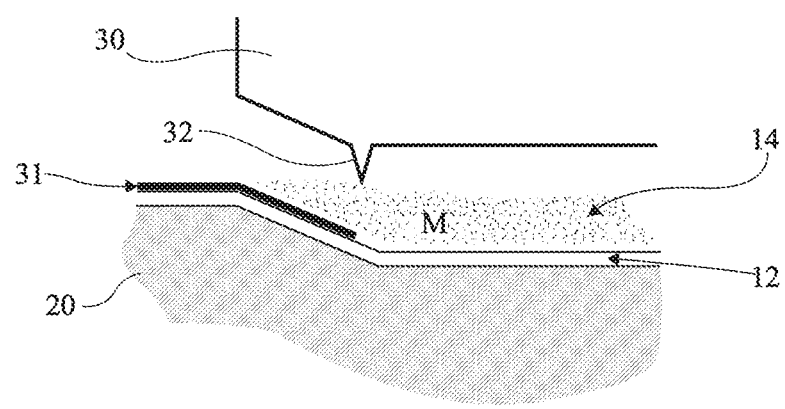
FIG. 8 shows a partial cross-section view of a mold before closing illustrating a step of an embodiment of a method of an alternative embodiment of a back panel of a seat element.

FIG. 8 shows a partial cross-section view of a mold before its closing illustrating a step of an alternative embodiment of a method of forming a back panel of a seat element.

This variation differs from the embodiment illustrated in FIG. 7 in that die 30 is provided with cutting tools 32. Cutting tools 32 enable to combine, with the pressing step, a cutting step. Such a cutting aims at removing a peripheral portion of expanded foam layer 14.

For this purpose, once layer 12 of non-expanded foam has been deposited on paint layer 10, not shown, a protection tool 31 is placed on a peripheral portion of layer 12. Layer 14 of expanded foam is then deposited, for example, by sputtering, on layer 12 and at least on a portion of protection tool 31. Die 30 is than deposited and pressed on and against layer 14 of expanded foam, thus closing mold 20. During this pressing, cutting tools 32 cut, for example, by shearing, at least a peripheral portion of layer 14 until it comes into contact with protection tool 31, thus protecting layers 10 of paint and 12 of non-expanded foam.

Protection tool 31 is for example made of metal, preferably of aluminum and is designed to embed into mold 20. The protection tool is arranged opposite cutting tools and has a shape adapted to the desired cut. The protection and cutting tools, 31 and 32, for example take the shape of a frame for a cut along the entire peripheral area of a rectangular panel, or the shape of tabs for a partial cutting of the peripheral area of the panel.

The protection and cutting tools, 31 and 32, may be arranged so that the cutting is performed along an assembly element, not shown, located between layer 12 and protection tool 31. As a variation, the cutting may be independent from the pressing, and may be performed subsequently by using any usual cutting tool.

An advantage of the panel such as described in relation with FIG. 6 is that the panel is rigid but remains easy to install due to its flexible area.

Various embodiments and variations have been described. It will be understood by those skilled in the art that certain features of these various embodiments and variations may be combined, and other variations will occur to those skilled in the art.

Finally, the practical implementation of the described embodiments and variations is within the abilities of those skilled in the art based on the functional indications given hereabove. In particular, the selection of the foams of different formulations to obtain the desired stiffness characteristics depends on the application.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of forming a back panel of a motor vehicle seat element, the method comprising:
   depositing a non-expanded foam layer formed of a first area of foam of a first stiffness and a second area of foam of a second stiffness, the second area of foam of the second stiffness disposed at a periphery of the first area of foam of the first stiffness, the first stiffness being harder than the second stiffness;
   depositing, in a mold, a layer of paint;
   depositing, on the paint layer, said non-expanded foam layer;
   depositing, on the non-expanded foam layer, an expanded foam layer; and
   a cutting step, enabling to remove a peripheral portion of the expanded foam layer.

2. The method of claim 1, wherein an element of assembly to the rest of the seat element is placed at least partly at the periphery of said non-expanded foam layer before the deposition of the expanded foam layer.

3. The method of claim 1, wherein the depositing of said expanded foam layer is performed on a portion of the surface of said non-expanded foam layer.

4. The method of claim 1, wherein the first area of foam has a Shore D hardness in the range from 0 to 100, or in the range from 30 to 60, or in the range from 40 to 50.

5. The method of claim 4, wherein the second area of foam has a Shore A hardness in the range from 0 to 90, or in the range from 50 to 80, or in the range from 60 to 70.

6. A back panel of a motor vehicle seat element comprising at least a first foam layer with at least two areas of different stiffness, the back panel formed according to the method of claim 1.

7. The back panel of claim 6, wherein said first foam layer is made of non-expanded foam.

8. The back panel of claim 7, wherein said panel comprises the stacking of a paint layer, said non-expanded foam layer, and an expanded foam layer.

9. The back panel of claim 8, wherein said expanded foam layer has a surface area smaller than the surface area of said non-expanded foam layer.

10. The back panel of claim 6, wherein each of said areas is made of foam having a different formulation.

11. The back panel of claim 6, wherein a first area has a Shore D hardness in the range from 0 to 100, or in the range from 30 to 60, or in the range from 40 to 50.

12. The back panel of claim 11, wherein a second area has a Shore A hardness in the range from 0 to 90, or in the range from 50 to 80, or in the range from 60 to 70.

13. The back panel of claim 11, wherein at least one device is fastened to the first area.

14. The back panel of claim 6, wherein said panel is provided with an element of assembly to the rest of the seat element, located at least partly at the periphery of said panel.

15. The back panel of claim 6, wherein said panel is a back panel of a backrest.

16. The back panel of claim 6, wherein said panel is a back panel of a headrest.

* * * * *